US008457912B1

(12) United States Patent
Wells

(10) Patent No.: US 8,457,912 B1
(45) Date of Patent: Jun. 4, 2013

(54) UNWRAPPING ANGLES FROM PHASOR MEASUREMENT UNITS

(71) Applicant: OSIsoft, LLC, San Leandro, CA (US)

(72) Inventor: Charles H. Wells, Emerald Hills, CA (US)

(73) Assignee: OSIsoft, LLC, San Leandro, CA (US)

( * ) Notice: Subject to any disclaimer, the term of this patent is extended or adjusted under 35 U.S.C. 154(b) by 0 days.

(21) Appl. No.: 13/753,786

(22) Filed: Jan. 30, 2013

Related U.S. Application Data

(60) Provisional application No. 61/592,529, filed on Jan. 30, 2012.

(51) Int. Cl.
*G01R 21/00* (2006.01)

(52) U.S. Cl.
USPC ................... 702/62; 702/60; 702/72

(58) Field of Classification Search
USPC ................... 702/60, 62, 72; 700/297; 363/36, 363/118, 148; 323/205
See application file for complete search history.

(56) References Cited

U.S. PATENT DOCUMENTS

| 7,234,340 B2 * | 6/2007 | Wen et al. ................... 73/11.04 |
| 2011/0276192 A1 * | 11/2011 | Ropp ............................ 700/293 |
| 2012/0179301 A1 * | 7/2012 | Aivaliotis et al. ............. 700/286 |

* cited by examiner

*Primary Examiner* — Elias Desta
(74) *Attorney, Agent, or Firm* — Lumen Patent Firm

(57) ABSTRACT

A method for monitoring a power grid uses power line sensors to measure time-stamped data representing AC current carried by the power grid at a multiple locations on the power grid, communicates the measured data from the power line sensors to a grid analysis device where the data measured by the power line sensors is synchronized and unwrapped to produce absolute phase data. The absolute phase data is then analyzed to generate predictions of instability of the power grid. The resulting unwrapped angle could also be called the "angle distance" from the reference.

9 Claims, 2 Drawing Sheets

110 Measure by a first power line sensor at a first power station bus first time-stamped data representing alternating current carried by a power grid.

112 Measure by a second power line sensor at a second power station bus second time-stamped data representing alternating current carried by the power grid.

114 Synchronize the first time-stamped data with the second time-stamped data, and unwrap phase angles to produce absolute phase differences between the first time-stamped data and the second time-stamped data.

116 Predict from an analysis of the absolute phase differences a grid instability.

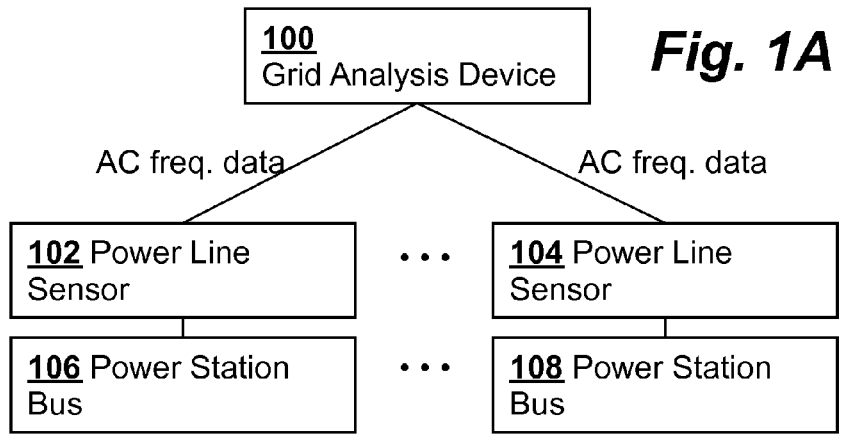

110 Measure by a first power line sensor at a first power station bus first time-stamped data representing alternating current carried by a power grid.

112 Measure by a second power line sensor at a second power station bus second time-stamped data representing alternating current carried by the power grid.

114 Synchronize the first time-stamped data with the second time-stamped data, and unwrap phase angles to produce absolute phase differences between the first time-stamped data and the second time-stamped data.

116 Predict from an analysis of the absolute phase differences a grid instability.

UNWRAPPING ANGLES FROM PHASOR MEASUREMENT UNITS

CROSS-REFERENCE TO RELATED APPLICATIONS

This application claims priority from U.S. Provisional Patent Application 61/592,529 filed Jan. 30, 2012, which is incorporated herein by reference.

FIELD OF THE INVENTION

The invention relates to electrical power grids, and, more specifically, to methods and systems for monitoring and controlling such power grids.

BACKGROUND OF THE INVENTION

Electric power grids that carry electrical power to homes and businesses are sometimes prone to failure, resulting in a blackout for the affected areas. The causes for grid failure include imbalances between load and power generation.

Power grids are usually monitored constantly for alternating current (AC) frequency. Power grid operators try to keep the AC frequency as close to a fixed frequency as possible. For example, the nominal AC frequency of the power grid in the US is 60 Hz, while in Europe and parts of Japan, the nominal AC frequency of the power grid is 50 Hz. While the AC frequency is nominally set at a certain value, the actual AC frequency drifts around the nominal value as a result of load and generation effects. An AC frequency error of ±0.02 Hz is well within the bounds of normal operation. The drift of the AC frequency, or drift frequency, refers to the deviation of the AC frequency from the nominal value. Typically, the drift frequency does not exceed 0.05 Hz in a stable system. The monitoring of the AC frequency, however, usually does not reveal information that would indicate impending failure in the power grid until it is too late to take actions that could prevent the failure.

A basic component of power grid monitoring and detection systems are phase measurement units (PMUs). A collection of PMUs connected to the power grid bus at various points in the grid provide real-time measurements of the phase of the electrical power signals in the grid.

Since the formation of the Eastern Interconnection Phasor Project (EIPP) and the subsequent formation of the North American SynchroPhasor Initiative (NASPI), utility companies have recognized the value of real-time data from PMUs. For example, during storm events, the role of PMUs in detecting and maintaining a power island has saved companies millions of dollars. However, there is still a need for effective techniques for the measurement, communication, and analysis of PMU data to provide useful predictions of grid instability. Current PMU measurement and analysis methods, however, do not enable the needed techniques.

SUMMARY OF THE INVENTION

In one aspect, the present invention provides a synchrophasor platform to collect and analyze PMU data in power grids.

Examining real phasor data from PMUs, the present inventor has identified and solved the unwrapping problem. A solution to this problem is important because there will be more than 1000 PMU installed this year in just the United States and over 2650 PMU in India in the next few years. Most people, however, do not even recognize the existence of the unwrapping problem.

By solving the unwrapping problem, the present technique will improve grid monitoring and help accelerate the acceptance of PMU in Smart Grid applications. More generally, the use of precisely synchronized PMU data enables a wide range of new applications. These will be derived based on observations of the raw data from the PMUs that are synchronized to an accuracy of better than one microsecond. These synchronized PMU data enable new applications.

In one aspect, the present invention provides innovative ways to unwrap the reported PMU angles to produce correct angles, eliminating large discontinuous angle jumps to produce a smooth stream of angles. Improving upon methods in which it is assumed that the maximum angle difference is 360 degrees, the method resolves integer cycle ambiguities to determine the absolute angle. The assumption that angles are less than 360 degrees (i.e., less than one integer cycle apart) is not always correct in the real world. The angle measurements over time can exceed 360 many times over. A classical example is when the two sections of the grid separate. Then the number of degrees of difference can be large (i.e., more than 15000). Embodiments of the invention provide a technique for computing the difference between two locations in a power grid by first unwrapping the angles measured by PMUs at different locations, and then subtracting the unwrapped angles.

The present technique has the advantage that it can be used directly in state estimators, for use in displaying angle surfaces, and for aiding in re-synchronizing islands back to the main grid. A key feature of the technique is that no additional reference angle is required. This is unique due to the fact that the reference is the GPS clock.

BRIEF DESCRIPTION OF THE DRAWINGS

FIG. 1A is a schematic block diagram of a system implementing a method for grid monitoring according to an embodiment of the invention.

FIG. 1B is a flow chart outlining steps of a method for grid monitoring according to an embodiment of the invention.

DETAILED DESCRIPTION

Figure 2:
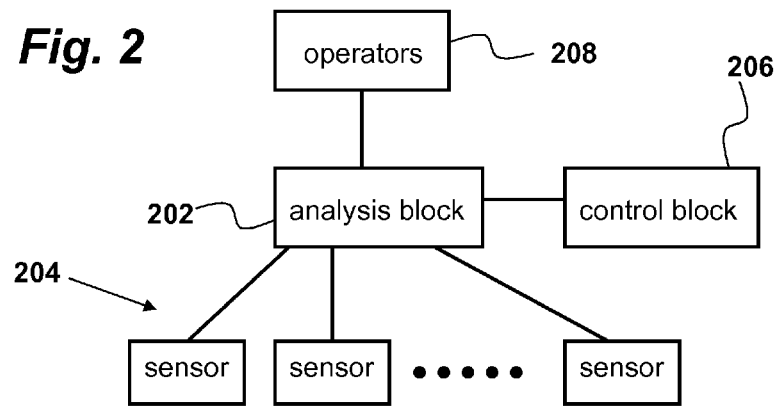
FIG. 2 is a block diagram of a system implementing a grid monitoring method.

In U.S. Pat. No. 7,490,013, which is incorporated herein by reference, the present inventor disclosed a power grid failure detection system that can warn operators of impeding failures or even automatically take emergency action. As shown in FIG. 2, this system uses multiple sensors 204 to gather frequency and phase information that feed an analysis block 202 to determine grid instabilities. The power grid is monitored at one or more locations using sensors 204 that measure AC frequency. The sensors can also gather other useful data such as phase, voltage, current, and power and this invention applies to these variables also.

Analysis block 202 is connected to one or more sensors 204, typically by a remote data network. The sensors preferably have a high sampling rate, e.g., 1 Hz, 20 Hz, or 60 Hz. The higher the sampling rate, the lower the noise in the signal, especially in higher order harmonics. Optionally, the analysis block 202 may be connected to a control block 206 used to automatically take corrective action in order to prevent a power grid failure. Possible corrective actions include increasing power generation or isolating control areas in the power grid. Also optionally, the analysis block 202 may be connected to human operators 208. For example, the analysis block may be configured to alert human operators 208 to the possibility of impending power grid failure. The human operators 208 would then be able to take corrective action. Data may be sent from the sensors 204 to the analysis block 202 by various means including via radio, via the internet, and via dedicated communication lines.

Preferably, the frequency is measured with a resolution of at least 0.05 Hz, and in common devices used in 2011 the resolution exceeds 0.001 Hz, and the phase would be measured with a resolution of at least 0.5 degrees, reporting values between 0 and 360 degrees (or, equivalently, between −180 and +180 degrees). Time is also be measured so that data from different sensors can be correlated. One way to have an accurate time stamp is to use global positioning system (GPS) signals. Preferably, each control area (sometimes referred to as a load pocket) has at least one sensor. A control area is a power grid component where a large amount of power is used. For example, California has multiple control areas and the US has roughly 140 control areas. By measuring what the grid is doing in the different control areas, a smart system can detect unstable interactions between the control areas.

A moving time window is used to group time domain data from a current time to a predetermined previous time, e.g., 3 min., 5 min., or 10 min. earlier. When a new data point is recorded (e.g., every 50 ms), the oldest data point in the window is dropped and the new point added to the window.

While the data is gathered in the time domain, the analysis is performed in the harmonic domain. For illustration purposes, this will be referred to as the harmonic content of the signal. One can use fast Fourier transforms (FFTs) to quickly convert the data from the time domain to the harmonic domain. (An inverse FFT can be used to return data from the harmonic domain to the time domain.) Once the data is in the harmonic domain, analysis can proceed.

Detecting grid instability is based on an analysis of the harmonic content. Specifically, by comparing the harmonic amplitude curve with a normalized amplitude curve (or trend line), one can detect spikes, or peaks, in the harmonic domain. While spikes in the harmonic curve are normal in the course of operation of a power grid, spikes that linger too long or are too under-damped may indicate instability in the power grid.

Figure 3:
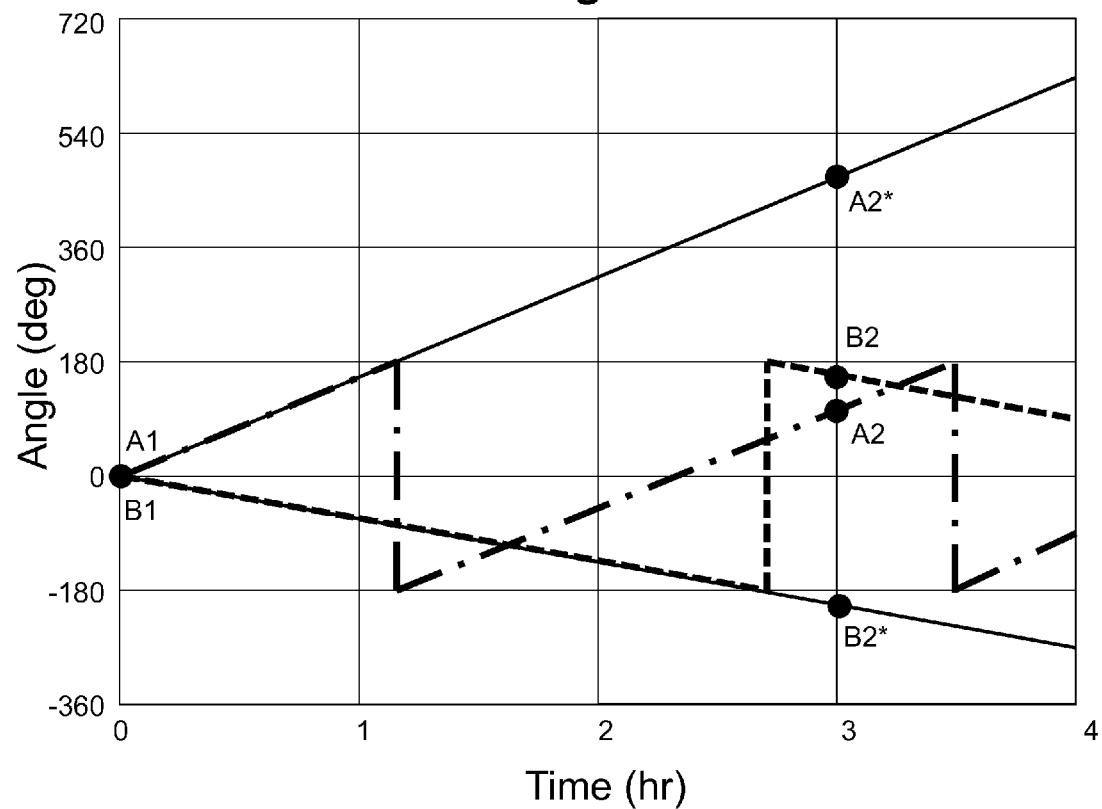
FIG. 3 is a graph illustrating the calculation of an angle difference between data measured at two locations on a power grid, comparing results from subtracting unwrapped angles with results from subtracting wrapped angles.

Angle measurements from PMUs meeting IEEE C37.118 standards are reported over the range ±π radians or ±180 degrees hence "wrap" when at the end of the range limits. Because the PMU phase data is reported within a limited range of one cycle, the relative phase over time at a sensor compared to a reference time, or the phase between two sensor locations in the grid has an integer cycle ambiguity. For example, as illustrated in FIG. 3, a PMU may report an first angle A1=0 degrees at an initial time t=0, and a second angle of A2=100 degrees at a later time t=3. The phase difference between these measurements would normally be calculated to be A2−A1=100 degrees, which assumes that the grid is operating normally and the phase does not change significantly over time. However, as shown in the figure, if the phase measurements are drifting over time so that they wrap one or more times between the two measurements, such as may happen during a grid instability, the accumulated phase difference could actually be significantly larger. In the example shown, the measured angle wrapped once, so the unwrapped angle is A2*=460. More generally, the unwrapped angle is A2*−A1=N*360+A2−A1, where N is the integer cycle difference.

Moreover, as the phases drifts over time, if the integer cycle N is not determined, then the unwrapped angle A2−A1 will display discontinuous jumps. These discontinuities result in faulty analysis of grid instabilities, especially when considering the angle difference between two separate locations on the grid. Subtraction of two discontinuous angles results in a discontinuous signal and since power flow is a function of the angle difference between two buses, the power flow direction could be ambiguous.

Moreover, without properly unwrapping the angles measured at separate locations in the grid, inaccurate conclusions about the angle difference between regions of the grid result. For example, FIG. 3 shows wrapped angle values B1=0 and B2=160 for a second location. (Note that A1=B1=0 because the angle measurements at both locations are both initialized at t=0.) If the wrapped angles A2 and B2 are subtracted without first unwrapping, the difference is B2−A2=60, which does not accurately represent the true angle difference between the locations. The correct angle difference is calculated by unwrapping the angles for both locations first, and then subtracting, i.e., B2*−A2*=−200−460=−660.

Thus, according to a preferred embodiment, angle measurements at distinct locations in the grid are individually unwrapped relative to earlier reference values for each of them, e.g., at midnight of each day. The unwrapped values are then subtracted from each other.

Table 1 below compares wrapped and unwrapped PMU data measured at two locations, Denver and San Leandro. Also shown is the angle difference, which is clearly different. Moreover, unwrapping the difference between wrapped angles is not the same as the difference between unwrapped angles (i.e., the operations do not commute).

TABLE 1

| Location | Wrapped Angle | Unwrapped Angle |
| --- | --- | --- |
| Denver | −73 | 4966 |
| San Leandro | −130 | 3470 |
| Difference | −203 | 1496 |

FIG. 1A is a schematic block diagram of a system implementing an embodiment of the method of the present invention. A grid analysis device 100 is connected to multiple power line sensors including first power line sensor 102 and second power line sensor 104. These sensors are connected to respective power station buses including first power station bus 106 and second power station bus 108. The power station buses and respective power line sensors are typically located at distant stations or substations of the grid. AC frequency data measured by the power line sensors are communicated to the central grid analysis device 100 via wired or wireless data communication links.

A method for power grid monitoring according to an embodiment of the invention is outlined in the flowchart of FIG. 1B. In steps 110 and 112, first and second time-stamped data representing AC current carried by a power grid are measured by first and second power line sensors at first and second locations on the grid, respectively. This data is communicated to the grid analysis device. In step 114 at the grid analysis device, the data are then synchronized and angles are unwrapped to produce absolute phase differences between the two locations on the grid. In step 116, the unwrapped phase differences are used by the grid analysis device to predict grid instability.

The method for power grid monitoring may be implemented by a system including a grid analysis device 100 connected to multiple power line sensors 102, 104, each of which is coupled to a power station bus 106, 108. The multiple power line sensors at the multiple respective power stations buses perform time-synchronized measurements of data representative of alternating current carried by a power grid. A grid analysis device synchronizes the data, unwraps the angles, analyzes the data and predicts a grid instability.

The data measured by the power line sensors at the power station buses may be frequency data, voltage data, power data, current data, or angle data representative of the alternating current carried by the grid. The data measured could also include positive sequence voltage, positive sequence current, positive sequence angle, negative sequence voltage, negative sequence current, negative sequence angle, zero sequence voltage, zero sequence current, and zero sequence angle.

For purposes of concrete illustration, we now describe a particular instantiation of a system according to one embodiment of the invention. Two PMUs can each send identical User Datagram Protocol (UDP) packets to software running at the grid analysis device. The header and command packets can be sent via Transmission Control Protocol/Internet Protocol (TCP/IP) because these packets are sent only at limited rates. However, the data streams flow at high rates, often including more than simply phasors. For example, in the Entergy PMU system, 22 PMUs are used (soon to be expanded under the Smart Grid Investment Grant Program). Each PMU sends 84 measurements in each packet. The data include phasor vectors in a rectangular or polar format, frequency, rate of change of frequency, and other measurements, including positive-sequence voltage and current phasors.

Header commands are sent by the interface to the PMUs every minute to determine if the PMUs have been reconfigured within the last minute. This information is part of the IEEE C37.118 standard, and any compliant PMU includes it.

The system uses substation-hardened computers. The hardware is based on low-power mobile-class central processing units (CPUs) configured to run the Windows Server 2008 standard 64-bit operating system. The computers are rated for high- and low-temperature operations, require no fans, and use 2 GB of memory with 120 GB of solid-state drive (SSD). There are no moving components in this system.

The IEEE C37.118 interface is loaded on each substation-hardened computer. There are two instances on each machine, one for PMU 102 and the other for PMU 103. Each of these machines is configured to collect multiple data streams from each PMU. The additional 600 measurements are collected once per second and include the first 50 harmonics in each phase for both current and voltage. This is especially important when using the system for transformer condition monitoring.

Each interface is configured to failover to a secondary interface. The interfaces on both computers run in parallel. One is considered primary, and the other is backup. When a failover occurs, the backup becomes primary, and the original interface is turned off. When the original interface is again available, it automatically becomes the backup, so it can become primary again when the secondary fails.

A high-availability historian software server is basically two identical historian software servers running on separate substation-hardened computers. In this case, one historian software server runs on Computer A, and another historian software server runs on Computer B. The two computers form a collective. Clients, when connecting to the server, use the collective name. They do not explicitly know to which historian software server they are connected. The client software requests connections to the collective manager. Clients can force a connection to a specific server; however, if that server fails, the connection is passed to the secondary server.

The display of phasor data may use either a desktop client or a web-based application. Display software from most manufacturers includes tools to simplify selections of PMU and data type to display. Most display systems include a method to jump or index from one PMU to another using a menu or drop-down box. The user can click on any PMU device listed to see the detailed trend lines for that device. The trend can be panned and zoomed to show history and details.

There are large differences when comparing the results of computing angle differences on a synchronous versus asynchronous basis. The time alignment may be performed on the computer at a 30 Hz rate.

Consider a classical second-order system with y as the input and x as the output. The x variable is the time-synchronized frequency difference between two disparate buses in the typical region. The x variable is computed at a 30 Hz rate from PMUs located at the two buses. It is likely that in the near future there will be PMUs at every major bus in the network; hence, it is possible to compute all combinations of frequency differences across the typal region.

As a concrete example, following is C++ code for unwrapping angles. This code example, however, performs a subtraction first then unwrapping. This is not the preferred method of unwrapping.

```
static double unwrapped_angle_difference (double A,
    double B)
{
double Diff=A−B;
return
    Diff<−180 ? Diff+360
      : Diff>180 ? Diff−360
      : Diff
    ;
```

Note that this calculation uses time-aligned data. The alignment could be done in Phasor Data Concentrators (PDCs); however, it is preferred to use the PI server functions to perform alignment on the specific data streams required. For example in this case there are only three data streams that have to be aligned to perform the unwrapped angle calculation.

In a method for power grid monitoring according to an embodiment of the invention, the first power line sensor 102 at the first power station bus 106 continuously measures first frequency data of AC current carried by the power grid. Similarly, the second power line sensor 104 at the second power station bus 108 continuously measures second frequency data of AC current carried by the power grid.

The measurements by the first power line sensor and the second power line sensor are time synchronized so that their frequency data are time synchronized. For example, the sensors may be time synchronized using signals from the global positioning system (GPS) and the measured data may be time-stamped to permit synchronization. The synchronized frequency data is communicated continuously from the power line sensors to the grid analysis device where the timestamps may be used to synchronize the frequency data from the different sensors. After synchronization, the grid analysis device 100 analyzes the measured data in real time and predicts a grid instability.

Certain grid monitoring applications benefit from unwrapped (smooth) absolute angles. These angles can exceed ±180 degrees. Specifically, new state estimators, island detection systems and angle contours (3D surfaces) could use this information.

According to the preferred implementation, these unwrapped angles may be computed from the directly measured angles as follows.

Initialization:

1. Read all angles that need to be converted to smooth variables at the exact same time instant. The time stamps must have accuracy of one micro second. Store these initial values into the initial values of the new smooth values.

Let $As_p(j)=Am_i(j)$, where $As_i(j)$ is the smoothed value of the i-th angle A at time j and $Am_i(j)$ is the measured value of the i-th angle A at time j. These are the initial values of the smoothed absolute angles.

Execution:

2. Read all values of the absolute angles at time j+1, $Am_i(j+1)$.

DO FOREVER
  begin when all values at time j+1, which is the "now" time are in memory, this is similar to the way a PDC works. i.e. wait until all values at time j+1 are in the array.
  this code can be written so that it works on a single value rather than waiting for all data points to arrive in the snapshot and storing these in a memory array. Single tag execution will result in lower latency.
FOR all i
  note, it is possible to do this for each i in a separate thread.
  compute the difference between the now value and the value at the last sample
  $\delta Am_i(j+1)=Am_i(j+1)-Am_i(j)$,
  compute a trial value of unwrapped angle for all values of i
  $As_i(j+1)=As_i(j)+\delta Am_i(j+1)$
  test for a rising angle transition, if true correct
  IF $(\delta Am_i(j+1))<-180$ THEN
    $As_i(j+1)=As_i(j+1)+360$
  ELSE
    test for a falling transition, if true correct
    IF $(\delta Am_i(j+1))>180$ THEN $As_i(j+1)=As_i(j+1)-360$
    ENDIF
  ENDIF
ENDFOR
ENDDO The computation of the unwrapped angle also has the added benefit that it provides the system time error. This is due primarily to the definition of the absolute angle from the C37.118 specification. The system reference time is at the peak of a 60 Hz cosine wave: at the top of second it has absolute angle of zero degrees and time error of zero. So by multiplying the unwrapped angle by (0.016667/360=0.000046), yields the time error. For example, suppose the unwrapped angle is 55 degrees; then time error is +0.002546 seconds. If the unwrapped angle is −16000; then the time error is −0.740742 seconds.

A numerical example is shown below.

| Wrapped angle | Unwrapped angle | |
|---|---|---|
| 25.082294 | 25.082294 | |
| 18.264194 | 18.264194 | |
| 10.944746 | 10.944746 | |
| 10.522409 | 10.522409 | |
| 10.155294 | 10.155294 | |
| 1.703506 | 1.703506 | |
| −7.594877 | −7.594877 | |
| −18.396341 | −18.396341 | |
| −30.02599 | −30.02599 | |
| −42.432812 | −42.432812 | |
| −56.12077 | 56.12077 | |
| −70.652786 | −70.652786 | |
| −85.713364 | −85.713364 | |
| −101.827103 | −101.827103 | |
| −119.07756 | −119.07756 | |
| −137.075607 | −137.075607 | |
| −156.089706 | −156.089706 | |
| −176.430283 | −176.430283 | |
| 162.075394 | −197.924606 | First wrap point |
| 139.574249 | −220.425751 | |
| 115.761284 | −244.238716 | |
| 90.733765 | −269.266235 | |
| 64.738274 | −295.261726 | |
| 37.72253 | −322.27747 | |
| 10.042175 | −349.957825 | |
| −18.625399 | −378.625399 | |
| −48.042084 | −408.042084 | |
| −78.37454 | −438.374542 | |
| −109.34465 | −469.34465 | |
| −141.09726 | −501.09726 | |
| −173.799789 | −533.799789 | |
| 152.938736 | −567.061264 | |
| 119.840286 | −600.159714 | |
| 86.139198 | −633.860802 | |
| 52.239567 | −667.760433 | |
| 18.282719 | −701.717281 | |
| −15.564197 | −735.564197 | |
| −49.277416 | −769.277416 | |
| −82.752235 | −802.752235 | |
| −115.773224 | −835.773224 | |
| −148.386276 | −868.386276 | |

One advantage of this method of unwrapping is that it can also be used to compute the angle differences between any two buses in the grid. This can also be used to re-synchronize islands formed in the grid. This can be accomplished by switching in the island when the main grid and the island frequencies are close (meeting IEEE 1547 standards).

The technique takes advantage of the fact that the measured data are in sequential order. One or two missing data records will not make much difference, but if a large number of data are missing the calculation will create a bias. To detect missing data, the time stamps are checked to make sure the data is in chronological order. A user set parameter will determine how many data points in a row are allowed to be missed. Suppose the number is "n". Then if number of points missing is greater than "n" the algorithm is "reset." If the number of missing point is less than "n" then all of the missing points can be interpolated and subsequently used to back-fill the missing unwrapped angle values. This should be marked as questionable in terms of their quality.

The algorithm can be initialized at any time; but all the angles being unwrapped are preferably reinitialized at the same time to facilitate subsequent comparison. The preferred time is midnight each day. This allows the user to compute the time error, and important requirement for grid managers. The time error is computed directly from the "angle distance" from the initial conditions. The angle distance could be another term used for the unwrapped angle.

In some embodiments, the unwrapped angles from multiple geographically separated locations (e.g., hundreds or thousands) may be used to generate a grid "weather map" analogous to a meteorological surface weather map. By geographical interpolation between unwrapped angle data at different locations, contours of equal angle ("isoangles") are generated and superimposed upon a geographical map, analogous to isotherms or isobars on a surface weather map. The regions between the isoangles are preferably shaded or colored. In addition, the same data may be displayed as a surface, where the height of the surface above a given map location corresponds to the unwrapped angle. An operator can pan and zoom and select objects on the 3D surface using a graphical user interface. Moreover, the graph can be updated frequently (e.g., at 60 Hz rate) to show the evolving map in real time. This functionality will significantly aid the operator in identifying grid problems. Operators would immediately see problems in the grid, indicated by low angles, depressions, high angles, and sharp slopes. The slope is in effect the frequency deviation from nominal (60 Hz), so that closely spaced isoangles indicate a power grid "weather front."

The invention claimed is:

1. A method for monitoring a power grid, the method comprising:

measuring by a first power line sensor first time-stamped data representing AC power carried by the power grid at a first location on the power grid;

measuring by a second power line sensor second time-stamped data representing AC power carried by the power grid at a second location on the power grid;

communicating from the first power line sensor to a grid analysis device the first time-stamped data representing AC power carried by the power grid at the first location on the power grid;

communicating from the second power line sensor to the grid analysis device the second time-stamped data representing AC power carried by the power grid at the second location on the power grid;

synchronizing by the grid analysis device the first time-stamped data representing AC power carried by the power grid at the first location on the power grid with the second time-stamped data representing AC power carried by the power grid at the second location on the power grid;

unwrapping by the grid analysis device the synchronized first time-stamped data to produce first unwrapped absolute angle data;

unwrapping by the grid analysis device the synchronized second time-stamped data to produce second unwrapped absolute angle data;

analyzing the first unwrapped absolute angle data and second unwrapped absolute angle data to generate predictions of instability of the power grid.

2. The method of claim 1 wherein the first time-stamped data representing AC power carried by the power grid at the first location on the power grid is time-stamped voltage data at the first location on the power grid.

3. The method of claim 1 wherein the second time-stamped data representing AC power carried by the power grid at the second location on the power grid is time-stamped voltage data at the second location on the power grid.

4. The method of claim 1 wherein the first time-stamped data representing AC power carried by the power grid at the first location on the power grid is time-stamped current data at the first location on the power grid.

5. The method of claim 1 wherein the second time-stamped data representing AC power carried by the power grid at the second location on the power grid is time-stamped current data at the second location on the power grid.

6. The method of claim 1 wherein the first time-stamped data representing AC power carried by the power grid at the first location on the power grid is time-stamped with an accuracy of less than one microsecond.

7. The method of claim 1 wherein the second time-stamped data representing AC power carried by the power grid at the second location on the power grid is time-stamped with an accuracy of less than one microsecond.

8. The method of claim 1 wherein analyzing the first unwrapped absolute angle data and second unwrapped absolute angle data comprises i) subtracting the first unwrapped absolute angle data and second unwrapped absolute angle data to produce an angle difference between AC power carried by the power grid at the first location on the power grid and AC power carried by the power grid at the second location on the power grid, and ii) computing from the angle difference a stress on the power grid.

9. The method of claim 1 wherein analyzing the first unwrapped absolute angle data and second unwrapped absolute angle data further comprises analyzing multiple unwrapped absolute angle data from multiple geographic locations to generate a geographical map comprising contours of equal unwrapped angles.

* * * * *